United States Patent
Tisenchek et al.

(10) Patent No.: US 7,470,103 B2
(45) Date of Patent: Dec. 30, 2008

(54) METHOD FOR DETERMINING LIMIT EXCEEDANCE

(75) Inventors: Nicholas Andrew Tisenchek, Clifton Park, NY (US); Darrin Glen Kirchhof, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 405 days.

(21) Appl. No.: 11/307,817

(22) Filed: Feb. 24, 2006

(65) Prior Publication Data

US 2007/0201975 A1  Aug. 30, 2007

(51) Int. Cl.
*F04D 29/00* (2006.01)
(52) U.S. Cl. .............................. 415/1; 415/17; 415/29; 415/49; 415/118
(58) Field of Classification Search .................... 415/1, 415/17, 29, 49, 118
See application file for complete search history.

(56) References Cited

U.S. PATENT DOCUMENTS

| | | | | |
|---|---|---|---|---|
| 4,412,780 A | * | 11/1983 | Collins et al. ................. | 415/17 |
| 4,589,255 A | * | 5/1986 | Martens et al. ............... | 60/646 |
| 4,655,041 A | * | 4/1987 | Del Vecchio et al. .......... | 60/646 |
| 5,157,619 A | * | 10/1992 | Palusamy et al. ............. | 702/43 |
| 6,647,728 B2 | * | 11/2003 | Seitz ........................... | 60/660 |

* cited by examiner

*Primary Examiner*—Igor Kershteyn
(74) *Attorney, Agent, or Firm*—Sutherland Asbill & Brennan LLP

(57) ABSTRACT

A method and system for determining a limit exceedance of an operating parameter in a steam turbine system. Measurement data associated with the operating parameter is received, and a limit exceedance is determined when the rate of change in the received data over a predefined period of time exceeds a predefined limit. A control action is taken when a limit exceedance has been determined.

20 Claims, 6 Drawing Sheets

METHOD FOR DETERMINING LIMIT EXCEEDANCE

FIELD OF THE INVENTION

The present invention relates generally to a method for determining limit exceedance, and more particularly to a method for determining operating parameter limit exceedance in steam turbines.

BACKGROUND OF THE INVENTION

During the operation of machinery and other equipment, it is often necessary to monitor the operating parameters of the equipment. Limits exist for operating parameters to limit the absolute magnitudes of the parameters and the duration in which a parameter exists at a given magnitude. For example, in the operation of a steam turbine, it is necessary to set control limits for various operating parameters such as the steam temperature within the turbine.

Typically, the limits of an operating parameter are defined by both the magnitude and duration of a limit exceedance. A parameter may go above a set limit for a short amount of time without adverse consequences; however, if the parameter exceeds the limit for long periods of time, the equipment may be damaged. Also, a gradual rate of change for a parameter may have no adverse consequences; whereas a sudden increase or decrease in the magnitude of a parameter may lead to equipment damage. For example, the steam temperature in a turbine may increase slowly over time with no equipment damage, but a sudden increase in temperature may cause serious damage to the steam turbine.

Current methods for measuring parameter limit exceedance detect the moment in time in which a limit is exceeded. A timer is then triggered to determine the duration for which the parameter exceeds the limit. Corrective action typically is taken only after the timer has run for a predetermined period while the parameter exceeds its magnitude limit. However, change in the parameter value while in excess of the magnitude limit, and perhaps even before the limit is reached, may be equally important for the determination or prediction of equipment damage. Therefore, there exist a need in the art for a system and method for monitoring and detecting parameter changes in the parameter magnitude other than just limit exceedance.

SUMMARY OF THE INVENTION

According to one embodiment of the invention, there is disclosed a method for determining limit exceedance of an operating parameter in a steam turbine system. This method includes receiving measurement data associated with an operating parameter and determining when the rate of change in the received data over a predefined period of time exceeds a predefined limit. A control action is taken when a limit exceedance has occurred.

According to another embodiment of the invention, there is disclosed a system for determining a limit exceedance of an operating parameter in a steam turbine system. This system includes a monitoring device coupled to a steam turbine of the steam turbine system for collecting measurement data associated with an operating parameter of the steam turbine system and a control unit in communication with the monitoring device to receive the measurement data. The control unit also includes program logic that determines when the rate of change in the received data over a predefined period of time exceeds a predefined limit and takes a control action when a limit exceedance has occurred.

Aspects of the invention described below apply to both a method for determining limit exceedance and a system for determining limit exceedance. According to one aspect of the invention, the received measurement data is associated with a temperature of steam entering a steam turbine of the steam turbine system. Alternatively, the received measurement data may be associated with a pressure of steam entering a steam turbine of the steam turbine system.

According to another aspect of the invention, determining a limit exceedance includes making a comparison of the received measurement data to a detection curve having a predefined rate of change of the magnitude of the measured operating parameter over a predefined length of time. According to yet another aspect of the invention, a plot is generated which contains a data curve from the received data over the predefined time period, and a limit exceedance is detected by determining a point in which the data curve crosses the detection.

According to yet another aspect of the invention, taking a control action includes setting off alarm. Alternatively, taking a control action includes transmitting an alarm signal. Taking a control action may also include adjusting the flow of an input that defines the operating parameter. Taking a control action may alternatively include shutting off a system that uses the operating parameter. According to yet another aspect of the invention, a signal indicating the taking of a control action may be stored.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
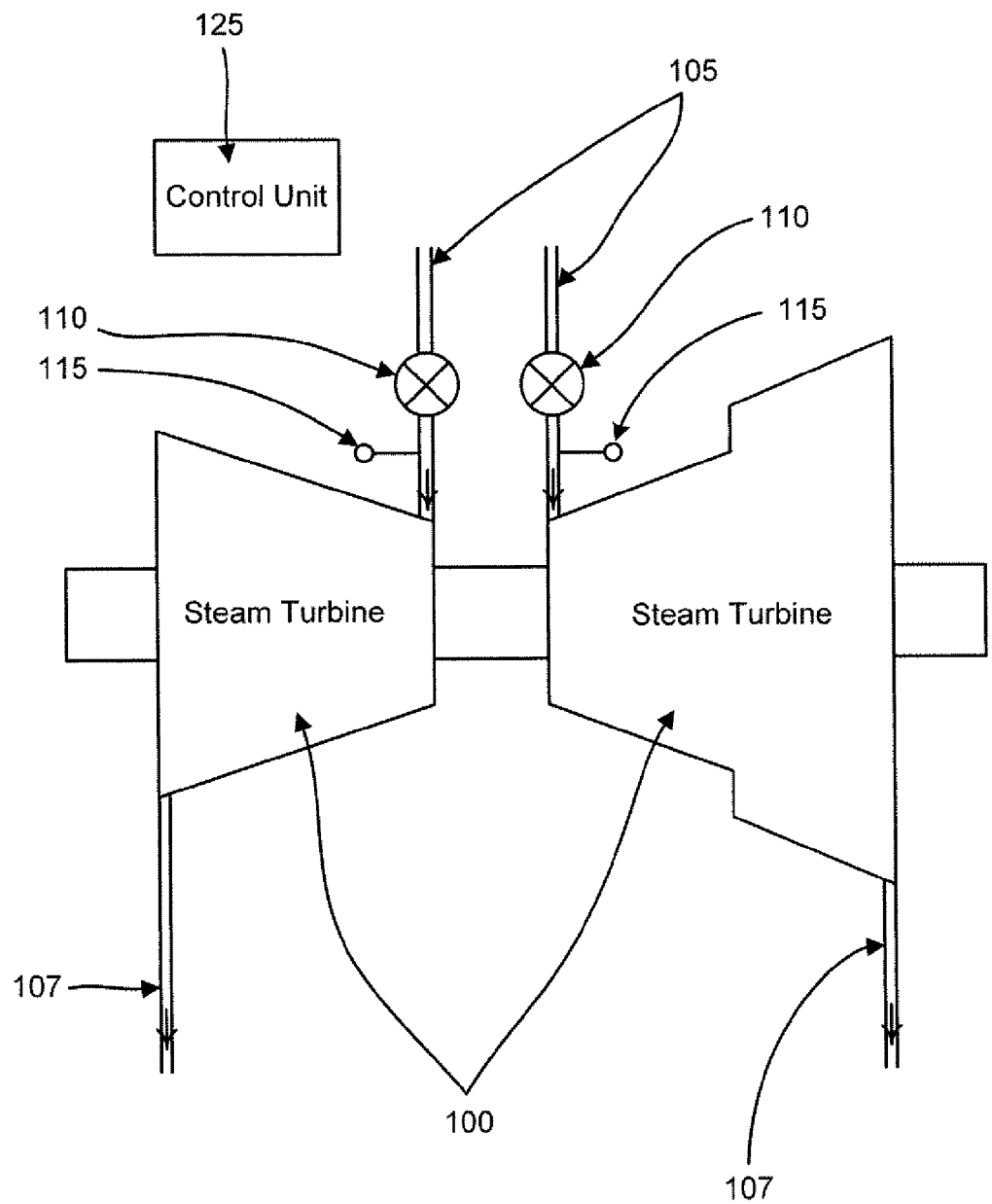
FIG. 1 is a schematic diagram of a steam turbine system implementing a method for determining limit exceedance, according to an illustrative embodiment of the present invention.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams of systems, methods, apparatuses and computer program products according to an embodiment of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by special purpose hardware-based computer systems that perform the specified functions or steps, or combinations of special purpose hardware and computer instructions.

The inventions may be implemented through an application program running on an operating system of a computer. The inventions also may be practiced with other computer system configurations, including hand-held devices, multi-processor systems, microprocessor based or programmable consumer electronics, mini-computers, mainframe computers, etc.

Application programs that are components of the invention may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network. Exemplary embodiments of the present invention will hereinafter be described with reference to the figures, in which like numerals indicate like elements throughout the several drawings.

According to an aspect of the present invention, a method for determining parameter limit exceedance incorporates both the allowable magnitude of a parameter and the rate of change of the parameter into one simple method. The total absolute change of the magnitude of a parameter is monitored over a time interval. The total magnitude change is then compared to a predefined limit curve to determine whether any parameter limits have been exceeded. If limits have been exceeded, the system will take corrective action.

FIG. 1 shows a steam turbine system implementing a method for determining limit exceedance, according to an illustrative embodiment of the present invention. Use of the present invention in a steam turbine system is only described as one representative example of an application of the present invention. It will be understood by those skilled in the art that the present invention can be implemented in any system in which the system parameters have magnitude limits and the magnitudes of the parameters vary over time. These systems include, but are not limited to, industrial machinery, steam turbines, gas turbines, other combustion systems, and hydraulic systems.

According to FIG. 1, steam turbines 100 are shown in a steam turbine system. Steam enters the steam turbines 100 by way of steam input pipes 105. Likewise, steam exits the steam turbines 100 by way of steam output pipes 107. The flow of steam through the steam input pipes 105 is controlled by steam valves 110. If the steam valves 110 are open, then steam will be allowed to flow through the steam input pipes 105. Alternatively, if the steam valves 110 are closed, steam will not be permitted to flow through the steam input pipes 105 into the steam turbines 100. Monitoring devices 115 monitor various parameters of the steam entering the pipe. The examples used herein relate to monitoring steam temperature, but it will be understood by those skilled in the art that other operating parameters of the steam turbine 100 could be monitored by the monitoring devices 115 including, but not limited to steam pressure, the metal temperature of the bearings used in the steam turbines 100, and any other variable parameter on which a limit may be placed. A control unit 125 receives measurement data from the monitoring devices 115 and may take corrective action if the data measurements exceed limits for the system, as described below.

Figure 2:
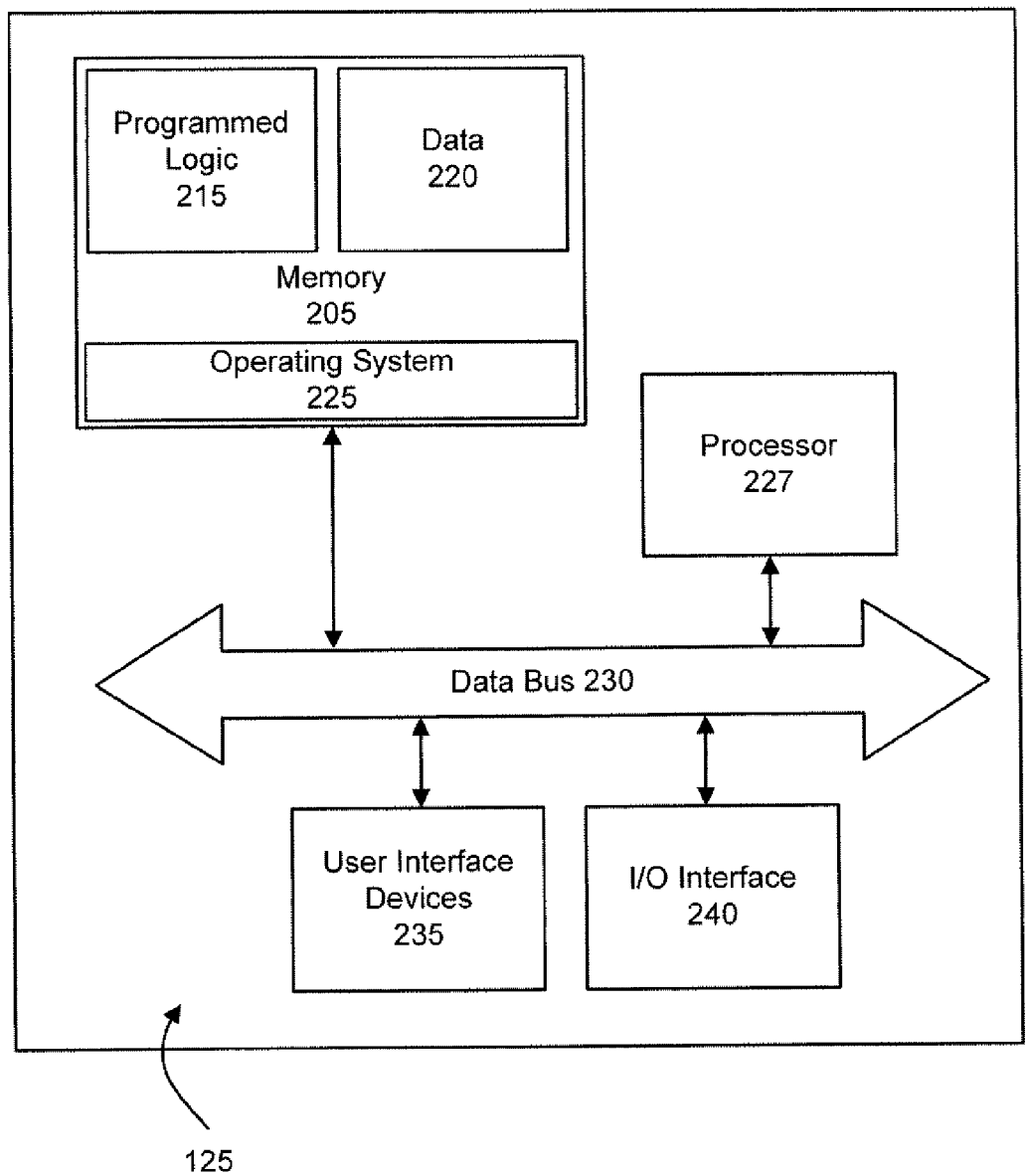
FIG. 2 is a block diagram of the control unit used in a method for determining limit exceedance, according to an illustrative embodiment of the present invention.

FIG. 2 shows a block diagram of the control unit 125 used in a method for determining limit exceedance, according to an illustrative embodiment of the present invention. The control unit 125 includes a memory 205 that stores programmed logic 215 (e.g., software) in accordance with the present invention. The memory 205 also includes measurement data 220 utilized in the operation of the present invention and an operating system 225. A processor 227 utilizes the operating system 225 to execute the programmed logic 215, and in doing so, also utilizes the measurement data 220. A data bus 230 provides communication between the memory 205 and the processor 227. Users interface with the control unit 125 via a user interface device(s) 235 such as a keyboard, mouse, control panel, or any other devices capable of communicating digital data to the control unit 125. The control unit 125 is in communication with the steam turbines 100 and perhaps other external devices, such as a steam turbine system, via an I/O Interface 240. In the illustrated embodiment, the control unit 125 is located remotely with respect to the steam turbines 100, though it may be co-located or even integrated with a steam turbine system. Further the control unit 125 and the programmed logic 215 implemented thereby may comprise software, hardware, firmware or any combination thereof.

Figure 3:
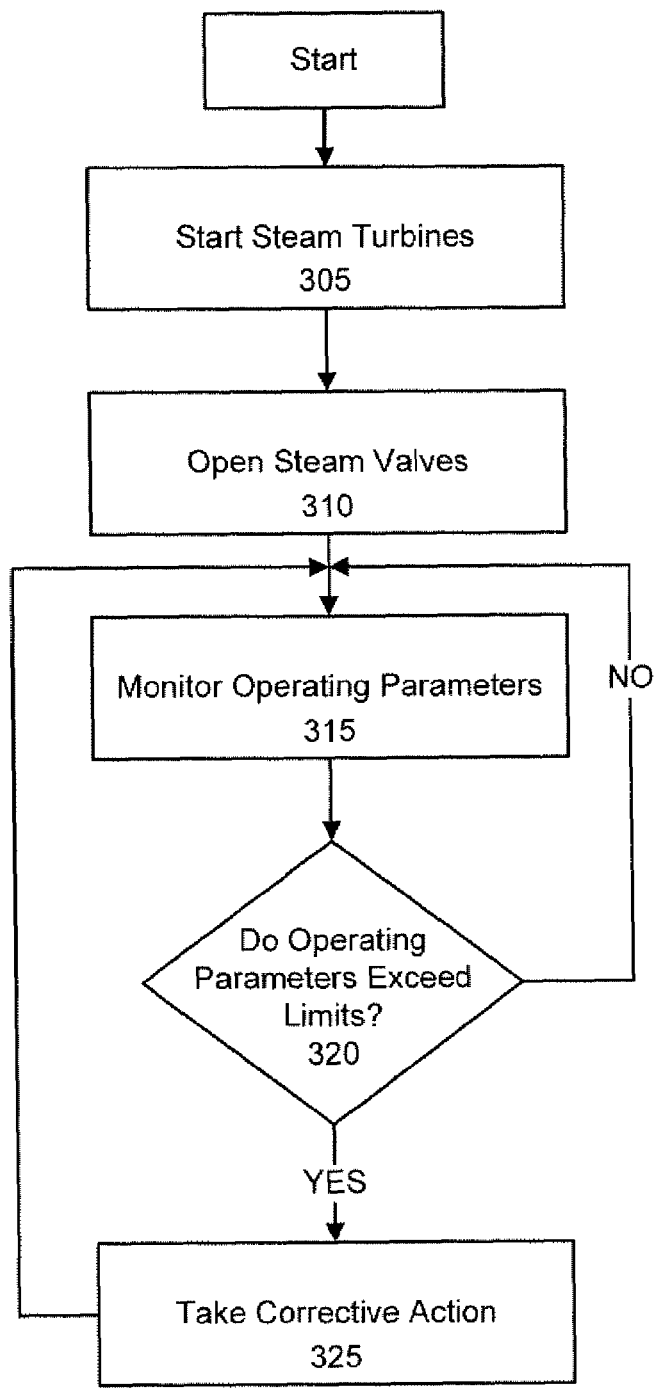
FIG. 3 is an exemplary flowchart of the control logic used by the control unit, according to an embodiment of the present invention.

FIG. 3 shows an exemplary flowchart of the control logic of a control unit 125 implementing the present invention, according to an embodiment of the present invention. At block 305, the steam turbine system is started up and the steam turbines 100 wait for steam to be input through the steam input pipes 105. The control unit 125 opens the steam valves 110 at block 310, allowing steam to flow into the steam turbines 100. The monitoring devices 115 continuously monitor the operating parameters, which is the steam temperature for purposes of an embodiment of the present invention. According to an aspect of the present invention, the monitoring devices 115 may provide measurement data to the control unit 125. Thus, the control unit 125 continuously monitors the operating parameters, as indicated by block 315. This measurement data may be, for example, actual measurements of an operational parameter or an absolute value representative of the change in an operational parameter. It will be appreciated by those of ordinary skill in the art that other forms of data associated with an operating parameter may be provided by the monitoring device 115 to the control unit 125. At block 320, the control unit 125 determines whether the operating parameters of the steam turbines 100 are within their operating limits. If the steam turbines 100 are operating within acceptable limits, then the control unit 125 returns to its monitoring of operating parameters 315. If, however, the steam turbines 100 are not operating within acceptable limits, then the control unit 125 will take corrective action, as indicated by block 325. According to an embodiment of the present invention, this corrective action 325 may be any control action. Control actions may include, but are not limited to setting off an alarm, transmitting an alarm signal, closing the steam valves 110, altering the temperature of the steam entering the steam turbines 100, altering the pressure of the steam entering the steam turbines 100, or shutting the system off altogether. Additionally, any triggered alarms or instances of a system operating outside of acceptable limits may be recorded in the memory 205 of the control system 125.

According to another aspect of the present invention, while monitoring an operating parameter at block 315, the control system 125 examines the absolute rate of change of the magnitude of an operating parameter within a preset time interval. Therefore, the control system 125 can determine whether any changes in the magnitude of an operating parameter occur at an undesirable rate. Using the steam temperature in a steam turbine as an example, there may be no damage to a steam turbine if the steam temperature rises by forty degrees over a twenty minute time period; however, the steam turbine could be seriously damaged if the same temperature increase occurred over a two minute time period. The length of the time period monitored by the control system 125 may be any preset time period, but the time period of twenty minutes will be used in the examples set forth below for illustrative purposes.

According to yet another aspect of the present invention, a detection curve is used to continuously monitor an operating parameter at block 315 and to detect a limit exceedance. The detection curve may be specific to one or both of the type of equipment being monitored and the operating parameter being monitored by the present invention. The detection curve may be any curve which defines the change in absolute magnitude limits for an operating parameter for the monitored time period. According to an aspect of the present invention, the detection curve is defined before an operating parameter is monitored. While the present invention is monitoring an operating parameter, the change in absolute magnitude of the operating parameter is compared to the detection curve to detect both instantaneous and gradual limit exceedance events.

While an operating parameter is being monitored at block 315 in FIG. 3, the absolute change in magnitude of the operating parameter that is compared to the detection curve is continuously monitored and updated. Data values representing the magnitude change of the operating parameter may be stored in the memory 205 of the control unit 125. According to an aspect of the present invention, the absolute magnitude change of the operating parameter is compared to the detection curve for the preset time period looking backwards from the present time. Thus, if the preset time period is twenty minutes, the rate of change in the monitored operating parameter will be examined for the last twenty minutes. During continuous monitoring of the operating parameter, the data being compared to the detection curve is continuously updated. If plotted, the data curve representing the absolute rate of change in magnitude of the operating parameter looking backwards over time would time-shift through a monitoring window, where the monitoring window represents the present time period being examined. The detection curve defines the limits for the rate of change of the operating parameter over the preset time period. A limit exceedance would occur at any point in which the data curve crosses the detection curve. A limit exceedance event will be detected by the continuous scanning of the control unit 125 at block 315. Given the detection of a limit exceedance by the present invention, it is not necessary to define a limit exceedance event by the amount of time in which an operating parameter remains above a magnitude limit level. Instead, the present invention automatically incorporates the amount of time over which an operating parameter is changing into its analysis, making it possible to detect situations in which an operating parameter is increasing or decreasing at a rate that may harm the equipment.

FIGS. 4-9 are graphs depicting three examples of the detection analysis of the present invention. In each example, the steam temperature in a steam turbine is examined over a twenty minute time period. It will be understood by those of skill in the art that these three examples are merely representative of one application of the present invention in the context of steam turbine system, and it is possible to implement the present invention in many different types of systems in order to monitor a broad range of operating parameters.

Figure 4:
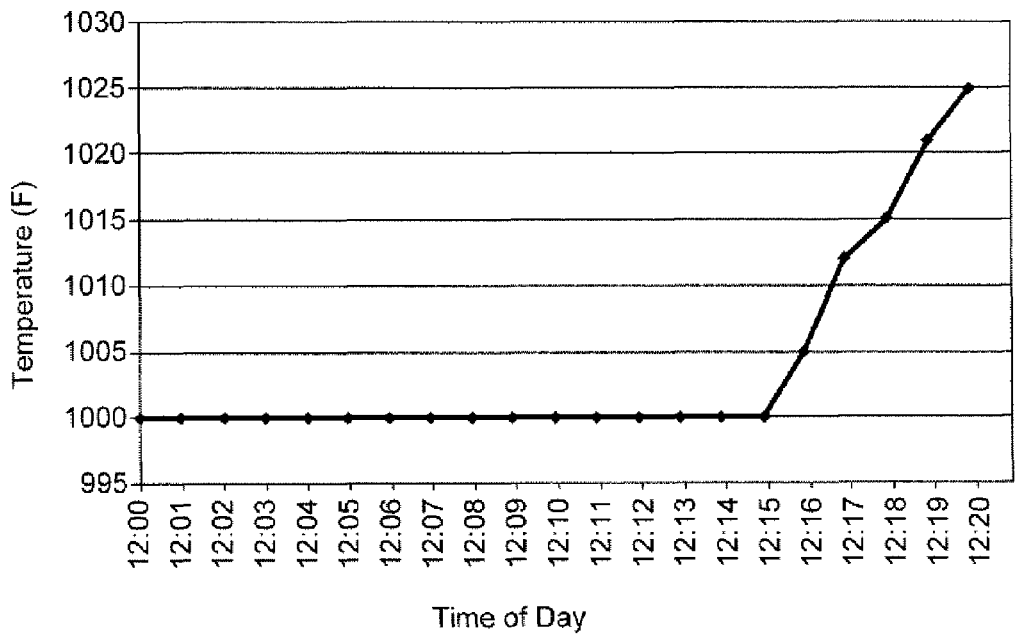
FIG. 4 is a graph depicting a first example of the data analyzed by the control unit, according to an embodiment of the present invention.

FIG. 4 is a graph depicting a first example of the data analyzed by the control unit 125, according to an embodiment of the present invention. FIG. 4 represents a situation in which the temperature of steam entering a steam turbine remains constant for a period of time and then increases rapidly over a short period of time. The temperature of steam entering a steam turbine is measured during a 20 minute time period. Steam temperature at 12:00 p.m. is 1000 degrees Fahrenheit (F) and the temperature remains at 1000 degrees until 12:15 p.m. The temperature then begins to increase until it reaches 1025 degrees at 12:20 p.m.

Figure 5:
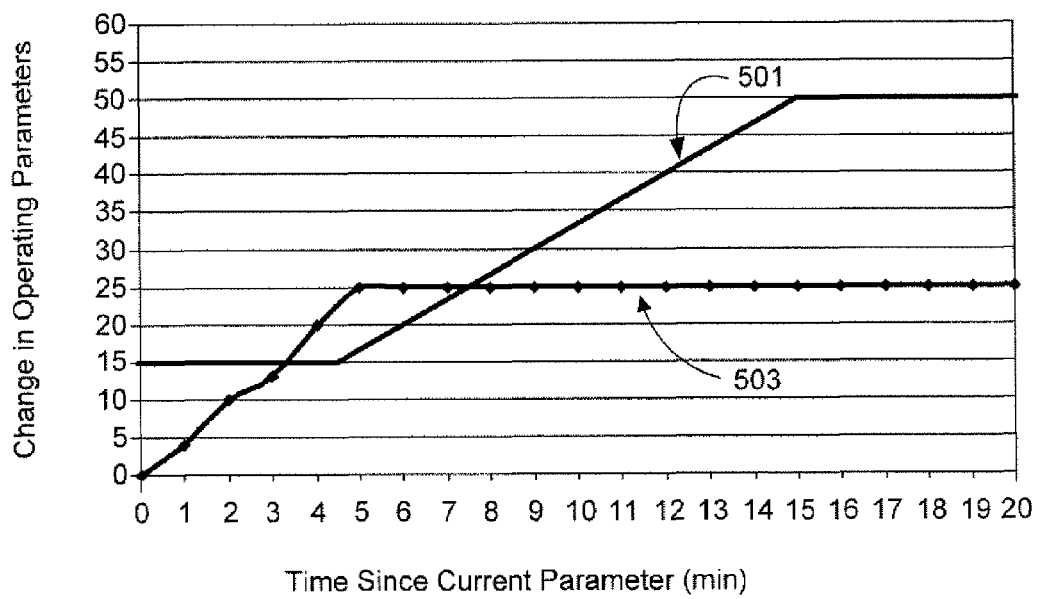
FIG. 5 is a graph depicting a first example of the data analysis of the control unit, according to an embodiment of the present invention.

FIG. 5 is a graph depicting a first example of the data analysis of the control unit, according to an embodiment of the present invention. A detection curve 501 for the steam turbine is shown in the data window. It is a horizontal curve from zero to four and a half minutes at which point it increases linearly until it is once again a horizontal curve from fifteen minutes until twenty minutes. The detection curve 501 is derived from and is specific to the equipment being monitored. For a steam turbine, the detection curve 501 is specific to the steam turbine being monitored and is derived from a combination of factors, including but not limited to, the size of the steam turbine, the type of steam turbine being monitored, and the configuration of the steam turbine during its operation. The detection curve 501 is programmed into the memory 205 of the control unit 125 before operation of the present invention. This detection curve 501 represents the limits for the absolute rate of change of the magnitude of steam temperature entering the steam turbine. For instance, the steam temperature can change by 15 degrees Fahrenheit in a four and a half minute time period without resulting in a limit exceedance. Likewise the steam temperature can change by 50 degrees Fahrenheit in a fifteen to twenty minute time period without resulting in a limit exceedance.

The cumulative absolute rate of change of the steam temperature from FIG. 4 is plotted for a twenty minute time period looking backwards from the present time to create a data curve 503. If the current time is 12:20, then the corresponding steam temperature is 1025 degrees Fahrenheit. Looking backwards, at 12:19, the steam temperature was 1021 degrees Fahrenheit. Thus, there was a cumulative absolute rate of change in steam temperature of four degrees one minute before the current time. This is represented by the data point at (1, 4) in the data curve 503. Similarly, at 12:15, the steam temperature was 1000 degrees Fahrenheit. Thus, there was a cumulative absolute rate of change in steam temperature of 25 degrees between the current time and 12:15, five minutes before the current time. This is represented by the data point at (5, 25) in the data curve 503. Between 12:00 and 12:15, the steam temperature remained constant at 1000 degrees Fahrenheit. Thus there was no change in steam temperature from 5 minutes before the current time until 20 minutes before the current time; however, there was a cumulative absolute rate of change of steam temperature of 25 degrees Fahrenheit for the same time period. Thus, the data curve 503 depicts a horizontal line running between the point (5, 25) and the point (20, 25). For ease in understanding the present example, steam temperature measurements in the examples of the operation of the present invention were only taken once every minute; however, it will be understood by those skilled in the art that any number of data measurements may be taken during the shifting time period analyzed for the operating parameter.

In the present example, a limit exceedance occurs when the data curve 503 first crosses the detection curve 501. At this point, the control unit 125 may take any control action which may include, but is not limited to, setting off an alarm, transferring an exceedance message, cooling the steam temperature in the steam turbine, cutting off the flow of steam into the turbine by closing the steam valves 110, or shutting off the steam turbines 100 altogether. Additionally, the control unit 125 may record any limit exceedance in its memory 210 for later retrieval.

Figure 6:
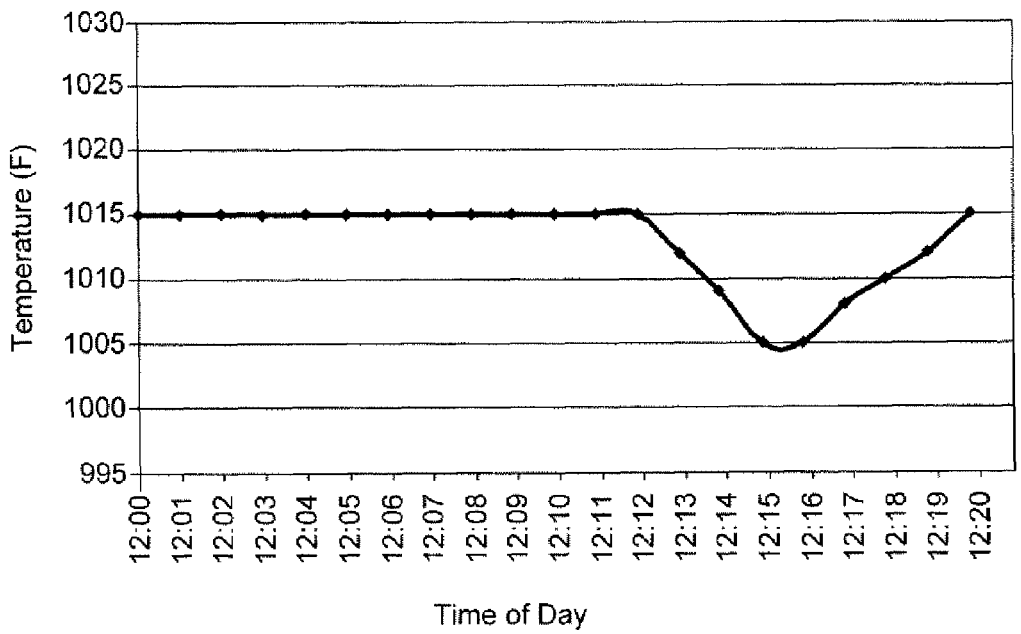
FIG. 6 is a graph depicting a second example of the data analyzed by the control unit, according to an embodiment of the present invention.

FIG. 6 is a graph depicting a second example of the data analyzed by the control unit, according to an embodiment of the present invention. FIG. 6 represents a situation in which the temperature of steam entering a steam turbine decreases and then returns to its initial temperature. At 12:00 p.m., the temperature of steam entering a steam turbine is 1015 degrees Fahrenheit. At 12:12 p.m., the temperature of steam begins to decrease until 12:15 p.m. where it is 1005 degrees Fahrenheit. At 12:16 p.m., the steam temperature begins to rise until it returns to 1015 degrees Fahrenheit at 12:20 p.m.

Figure 7:
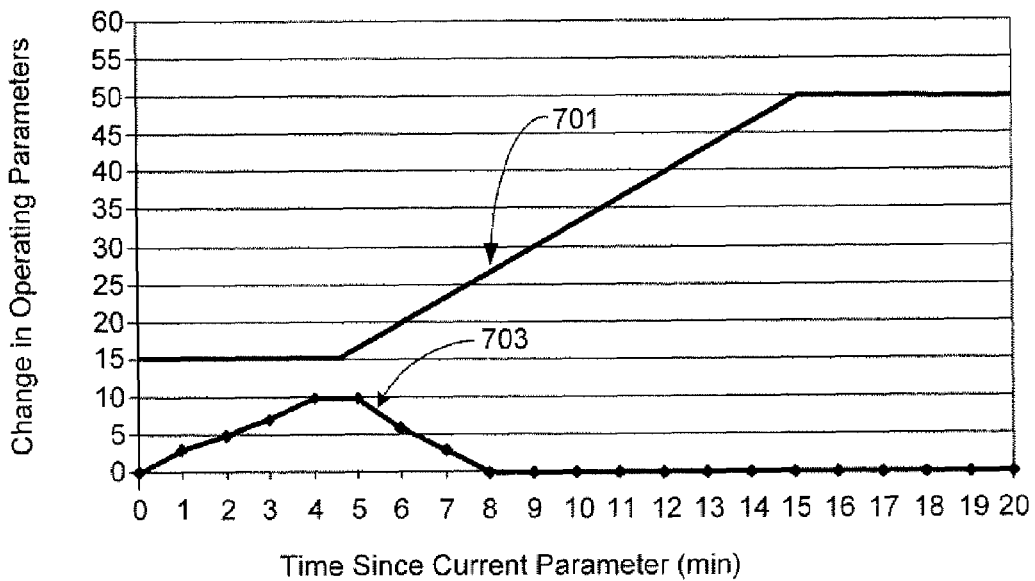
FIG. 7 is a graph depicting a second example of the data analysis of the control unit, according to an embodiment of the present invention.

FIG. 7 is a graph depicting a second example of the data analysis of the control unit 125, according to an embodiment of the present invention. The detection curve 701 is the same as that depicted in FIG. 5. Similar to the example depicted in FIG. 5, the cumulative absolute temperature change of the steam entering a steam turbine from FIG. 6 is plotted for a twenty minute time period looking backwards from the present time to create a data curve 703. The present time is 12:20 p.m. and the data is plotted for the time period looking backwards to 12:00 p.m. There is a hump created in the data curve 703 where the steam temperature decreased by 10 degrees Fahrenheit and then rose back to its original temperature. At no point does the cumulative absolute change in steam temperature exceed the limits defined by the detection curve 701. Therefore, the steam temperature remains within acceptable operating limits for purposes of this example.

Figure 8:
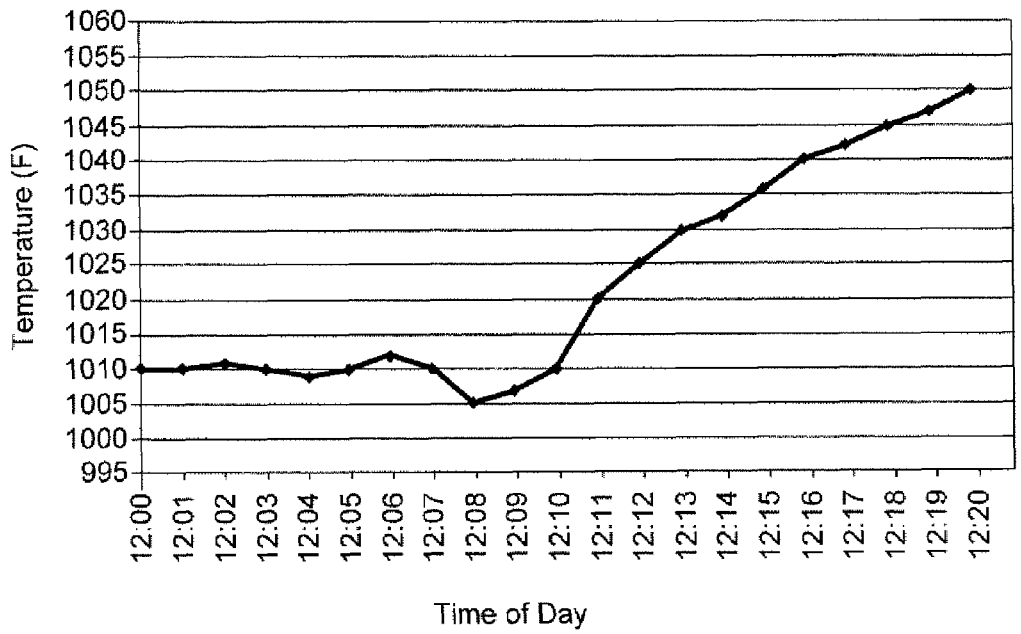
FIG. 8 is a graph depicting a third example of the data analyzed by the control unit, according to an embodiment of the present invention.

FIG. 8 is a graph depicting a third example of the data analyzed by the control unit, according to an embodiment of the present invention. FIG. 8 represents a situation in which the steam temperature entering a steam turbine increases gradually over the time period analyzed. The steam temperature remains relatively constant at 1010 degrees Fahrenheit from 12:00 p.m. until 12:07 p.m. The temperature then falls to 1005 degrees Fahrenheit at 12:08 p.m. and starts to gradually increase until it reaches 1050 degrees Fahrenheit at 12:20 p.m.

Figure 9:
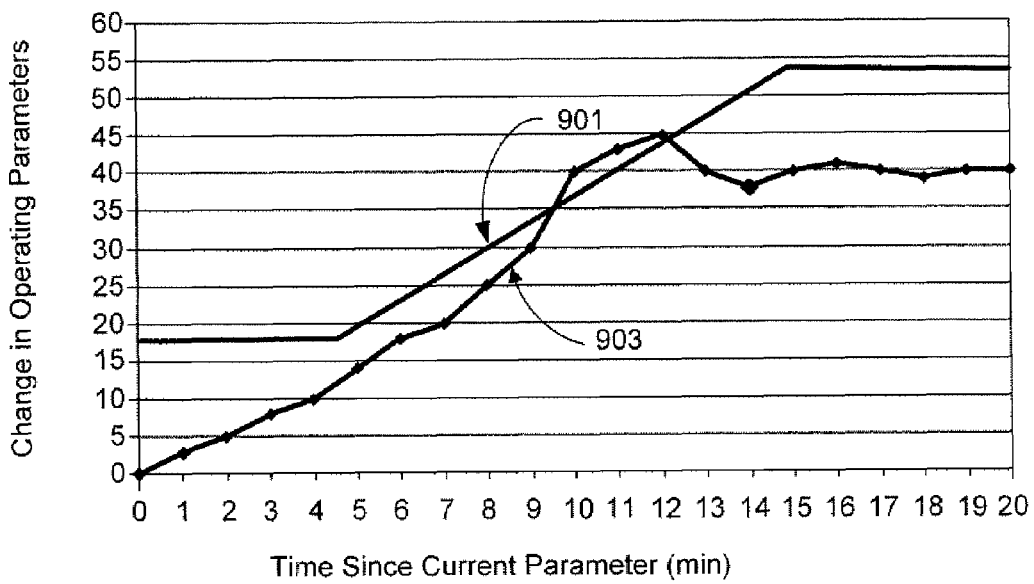
FIG. 9 is a graph depicting a third example of the data analysis of the control unit, according to an embodiment of the present invention.

FIG. 9 is a graph depicting a third example of the data analysis of the control unit, according to an embodiment of the present invention. The detection curve 901 is the same as that depicted in FIGS. 5 and 7. Similar to the previous examples, the cumulative absolute temperature change of the steam entering a steam turbine from FIG. 8 is plotted for a twenty minute time period looking backward from the present time to create a data curve 903. The current time for purposes of the data curve 903 is 12:20 p.m. The data curve 903 depicts the gradual rise in temperature between 12:08 p.m., which is 12 minutes prior to the current time, until the current time. Similar to the example in FIGS. 4 and 5, a limit exceedance occurs where the data curve 903 first crosses the detection curve 901. At this point, which is roughly the data point (9, 30), the control unit 125 may take any control action as described earlier. It is to be understood that the examples depicted above represent only three specific instances of time in monitoring operating parameters. During the normal operation of the present invention, operating parameters are continuously monitored. A different data curve could be generated for each specific instance in time during the monitoring of an operating parameter.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for determining limit exceedance of an operating parameter in a steam turbine system, the method comprising:
   receiving measurement data associated with an operating parameter of a steam turbine;
   determining, based at least in part on the measurement data, a cumulative rate of change curve for the operating parameter over a predetermined period of time;

comparing the cumulative rate of change curve to a predetermined rate of change curve for the predetermined period of time;
determining when the cumulative rate of change curve intersects the predetermined rate of change curve; and
implementing a control action when an intersection has occurred.

2. The method of claim 1, wherein receiving measurement data comprises receiving data associated with a temperature of steam entering a steam turbine of the steam turbine system.

3. The method of claim 1, wherein receiving measurement data comprises receiving data associated with a pressure of steam entering a steam turbine of the steam turbine system.

4. The method of claim 1, further comprising:
generating a plot of the cumulative rate of change curve and the predetermined rate of change curve over the predetermined period of time.

5. The method of claim 1, wherein taking a control action comprises setting off an alarm.

6. The method of claim 1, wherein taking a control action comprises transmitting an alarm signal.

7. The method of claim 1, wherein taking a control action comprises adjusting a flow of an input that defines the operating parameter.

8. The method of claim 1, wherein taking a control action comprises shutting off a system that uses the operating parameter.

9. The method of claim 1, further comprising storing a signal indicating the taking of a control action.

10. The method of claim 1, wherein determining a cumulative rate of change curve comprises determining a curve based at least in part on a plurality of cumulative absolute values of the rates of change of the operating parameter over the predetermined time interval.

11. A system for determining a limit exceedance of an operating parameter in a steam turbine system, the system comprising:
a monitoring device coupled to a steam turbine of the steam turbine system, the monitoring device operable to collect system for collecting measurement data associated with an operating parameter of the steam turbine system; and
a control unit in communication with the monitoring device, the control unit operable to:
receive the measurement data
determine, based at least in part on the measurement data, a cumulative rate of change curve for the operating parameter over a predetermined period of time;
compare the cumulative rate of change curve to a predetermined rate of change curve for the predetermined period of time;
determine when the cumulative rate of change curve intersects the predetermined rate of change curve, and
implement a control action when an intersection has occurred.

12. The system of claim 11, wherein the measurement data comprises data associated with a temperature of steam entering a steam turbine of the steam turbine system.

13. The system of claim 11, wherein the measurement data comprises data associated with a pressure of steam entering a steam turbine of the steam turbine system.

14. The system of claim 11, wherein the control unit is further operable to:
generate a plot of the cumulative rate of change curve and the predetermined rate of change curve over the predetermined period of time.

15. The system of claim 11, wherein a control action comprises a setting off of an alarm.

16. The system of claim 11, wherein a control action comprises the transmission of an alarm signal.

17. The system of claim 11, wherein a control action comprises an adjustment of a flow of an input that defines the operating parameter.

18. The system of claim 11, wherein a control action comprises a shutting off of a system that uses the operating parameter.

19. The system of claim 11, wherein the processor is further operable to store a signal indicating the taking of a control action.

20. The system of claim 11, wherein the processor is operable to determine a cumulative rate of change curve based at least in part on a plurality of cumulative absolute values of the rates of change of the operating parameter over the predetermined time interval.

* * * * *

UNITED STATES PATENT AND TRADEMARK OFFICE
CERTIFICATE OF CORRECTION

PATENT NO. : 7,470,103 B2  
APPLICATION NO. : 11/307817  
DATED : December 30, 2008  
INVENTOR(S) : Tisenchek et al.

Page 1 of 1

It is certified that error appears in the above-identified patent and that said Letters Patent is hereby corrected as shown below:

Column 9, Line 41 – Remove "system for collecting"

Signed and Sealed this

Twenty-fourth Day of February, 2009

JOHN DOLL  
*Acting Director of the United States Patent and Trademark Office*